United States Patent [19]
Ketcham

[11] Patent Number: 5,423,577
[45] Date of Patent: Jun. 13, 1995

[54] TUBING CONNECTOR

[75] Inventor: Mark G. Ketcham, Marine City, Mich.

[73] Assignee: Bundy Corporation, Warren, Mich.

[21] Appl. No.: 39,348

[22] PCT Filed: Jan. 17, 1992

[86] PCT No.: PCT/US92/00426

§ 371 Date: Apr. 21, 1993

§ 102(e) Date: Apr. 21, 1993

[51] Int. Cl.[6] .............................................. F16L 37/14
[52] U.S. Cl. .................................... 285/305; 285/319;
285/351; 285/910; 285/918; 277/DIG. 6
[58] Field of Search ............... 285/319, 351, 910, 921,
285/305, 918; 277/DIG. 6

[56] References Cited
U.S. PATENT DOCUMENTS

| | | | |
|---|---|---|---|
| 2,774,621 | 12/1956 | Kilbourne | 285/910 X |
| 3,493,645 | 2/1970 | Sanderson et al. | 285/910 X |
| 4,223,897 | 9/1980 | Staab et al. | |
| 4,283,064 | 8/1981 | Staab et al. | |
| 4,615,547 | 10/1986 | Sutcliffe et al. | 285/351 X |
| 4,936,544 | 6/1990 | Bartholomew | 285/319 X |

Primary Examiner—Dave W. Arola
Attorney, Agent, or Firm—Dorn, McEachran, Jambor & Keating

[57] ABSTRACT

An inventive tubing connector includes a tube (22) having an upset portion (24) receiving within a housing (26). a retainer (30) is positioned between an outer end of the housing and the upset portion to prevent tube removal. A seal (48) within the housing provides a fluid tight seal between the housing and the tube. The seal is preferably formed of toughened fluorosilicone, such that it provides a secure fluid tight seal over a temperature range down to about −50° below zero.

7 Claims, 3 Drawing Sheets

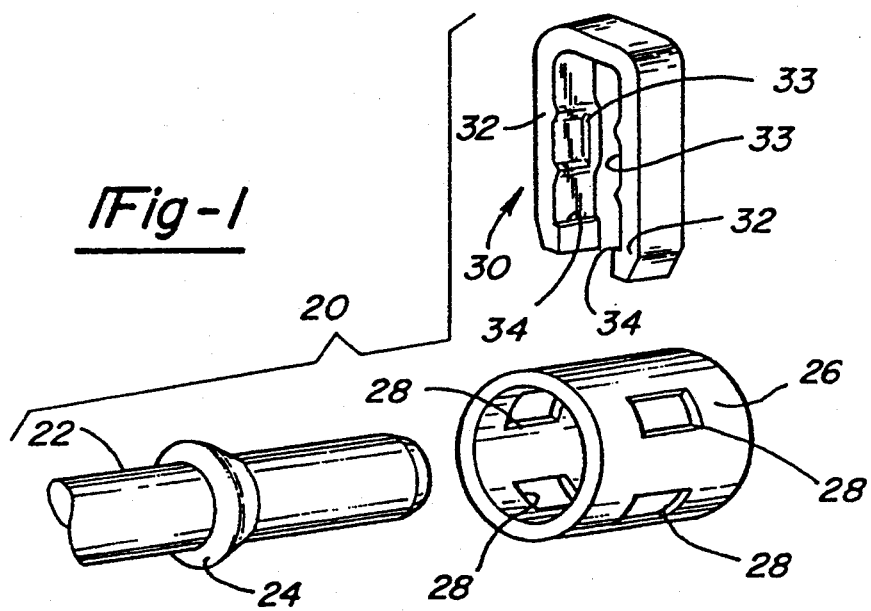
Fig-1
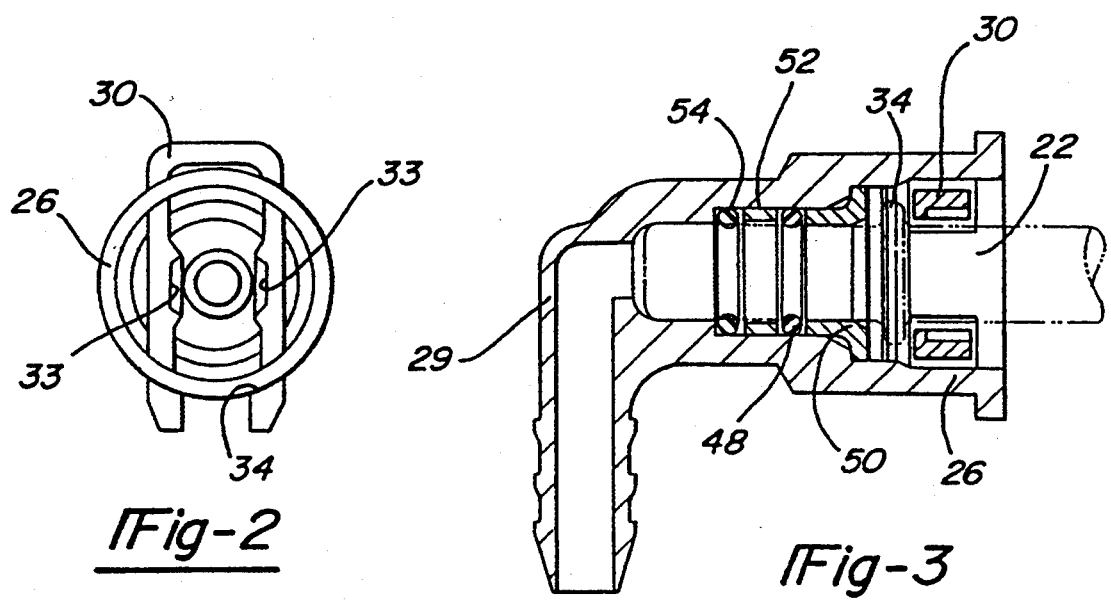
Fig-2
Fig-3
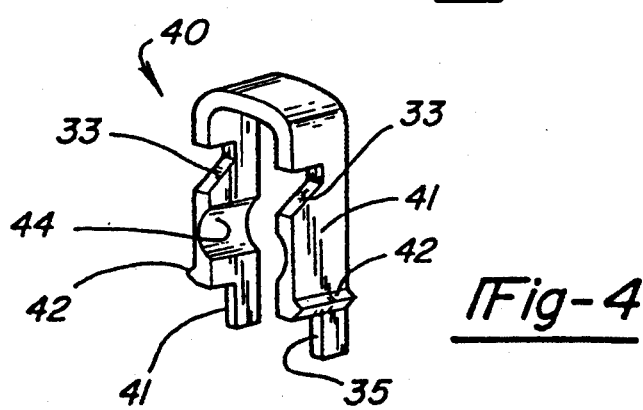
Fig-4

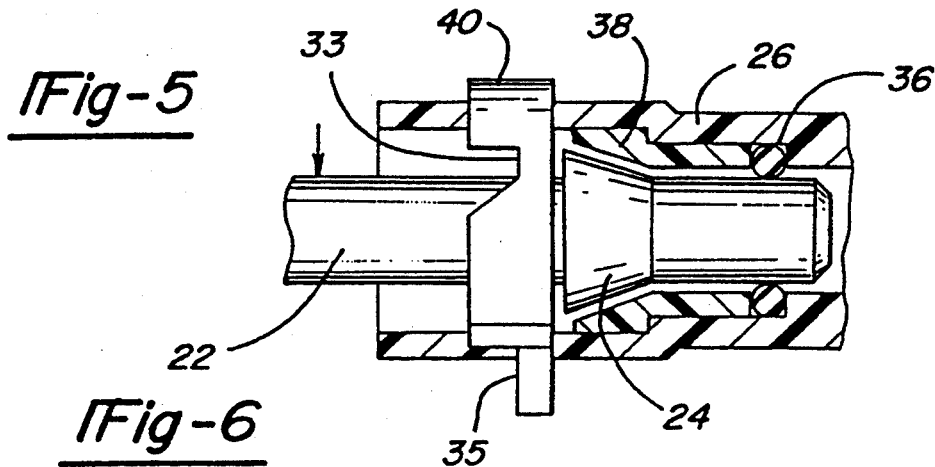
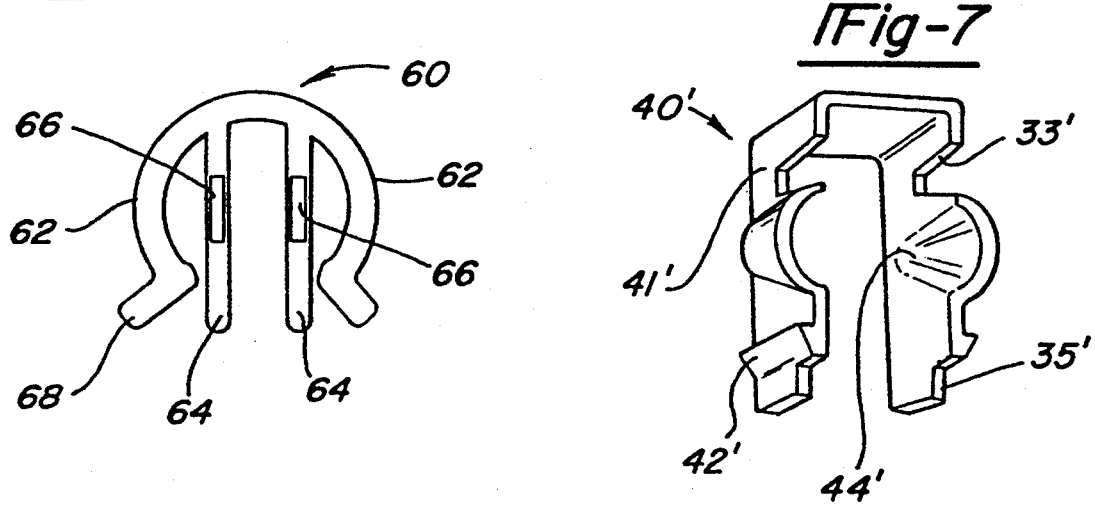
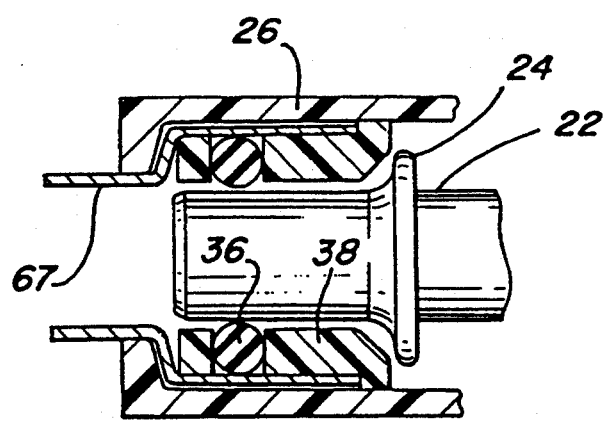
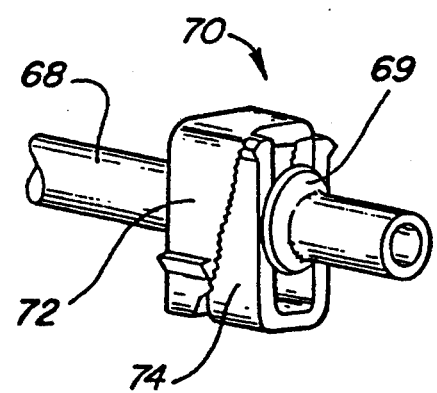

TUBING CONNECTOR

BACKGROUND OF THE INVENTION

This application relates to improvements in tubing connectors.

Various types of tubing connectors are known wherein a tube is connected by a threaded member to a housing body. Several of these tubing connectors are used on most vehicles. These systems have proven somewhat deficient in that they are time consuming and difficult to assemble. Further, it is difficult to ensure that the tube is properly positioned within the housing body with such connectors.

Known tubing connectors may have included a seal to provide a fluid tight seal between tile housing body and the tube. These seals may have been formed of materials such that they provide a fluid tight seal at temperatures down to about 20° below zero Fahrenheit. Until recently, vehicles have not been operable below that temperature range. Recently, however, modifications to vehicle technology have allowed vehicles to operate at temperatures ranging down to 40° below zero Fahrenheit. Thus, the prior art seals may prove somewhat deficient in the lower temperature ranges.

SUMMARY OF THE INVENTION

In a disclosed embodiment of the present invention, a tube having a radially enlarged, or upset portion is positioned within a housing. A resilient retainer abuts the upset portion and prevents tube removal. Several retainer embodiments are disclosed.

Seals are positioned within the housing to provide a fluid tight seal between the housing and an inner end of the tube. Preferably, there are two spaced seals, with an outer seal being formed of toughened fluorosilicone, and the inner seal being formed of a blend of fluorosilicone and fluorocarbon. The outer seal is adaptable to lower temperature ranges, and provides a good seal down to about 50° below zero Fahrenheit. The outer seal is formed of a material which has proven fluid tight reliability at less extreme temperature ranges. The combination of the two seals provides a fluid tight seal that is reliable across the normal the vehicle operating temperature range.

These and other features of the present invention can be best understood from the following specification and drawings, of which the following is a brief description.

BRIEF DESCRIPTION OF THE DRAWINGS

FIG. 1 is a perspective exploded view of a first embodiment tubing connector.

FIG. 2 is an end view through the first embodiment tubing connector in an assembled condition.

FIG. 3 is a cross-sectional view through the tubing connector shown in FIG. 2.

FIG. 4 is a perspective view of a second embodiment retainer.

FIG. 5 is a cross-sectional view of the second embodiment retainer.

FIG. 6 is an end view of a third embodiment retainer according to the present invention.

FIG. 7 is a perspective view of a fourth embodiment retainer.

FIG. 8 is a cross-sectional view showing details of the connection of a metal conduit.

FIG. 9 is a perspective view of a fifth embodiment retainer.

DETAILED DESCRIPTION OF A PREFERRED EMBODIMENT

Figure 10:
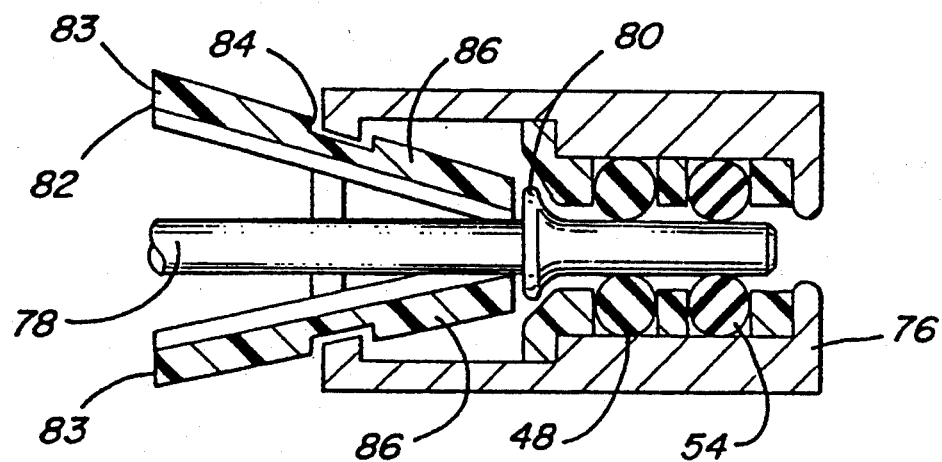
FIG. 10 is a cross-sectional view through a sixth embodiment retainer.

A tubing connector 20 includes tube 22 having upset portion 24, and positioned within a connector housing 26, shown partially cut away. Upset portion 24 is outwardly ramped. A plurality of slots 28 extend through the wall of connector housing 26 and receive a retainer 30. Retainer 30 has a pair of legs 32 which extend through spaced slots 28 and are received axially outwardly of upset portion 24 to retain tube 22 within housing 26. Slots 28 are sufficiently large to allow legs 32 to move radially. Latches 34 ensure that retainer 30 is not removed from housing 26. Surfaces 33 conform to the shape of tube 22, and are biased radially outwardly by upset portion 24, to allow passage of upset portion 24 into housing 26 to a connected position. The ramped upset portion 24 facilitates this insertion.

FIG. 2 shows retainer 30 received within housing 26. Surfaces 33 would be contacted by a tube upon insertion, Latches 34 prevent removal of retainer 30 from housing 26.

As shown in FIG. 3, a first outer seal 48 is spaced from an outer end of tube 22 by a spacer 50. A second spacer 52 is disposed between first seal 48 and a second inner seal 54. In a preferred embodiment of the present invention, first seal 48 is formed of a material which is resistant to extremely low temperatures, and which is also resistant to abrasion. In one embodiment an O-ring formed of entirely of toughened fluorosilicone is used. In a further preferred embodiment of the present invention, second seal 54 is formed of a different material which has proven fluid sealing capability at less extreme temperature ranges. This inner seal 54 is not contacted by a tube for as long as seal 48. In one preferred embodiment, a blend of fluorosilicone and fluorocarbon was used for second seal 54. The spacers may be formed of Nylon 11 or 12. Housing 26 is preferably a 90 degree elbow with an extension 29 having a serrated outer periphery for receiving a flexible tubing.

FIG. 4 shows an alternative retainer 40 having legs 41 with inner surfaces 4a conforming to the shape of tube 22. Thinner portions 33 and 35 will allow bleed-off of high pressure, as will be explained below. Latches 42 extend laterally outwardly from legs 41.

As shown in FIG. 5, when retainer 40 is received within housing 26, it prevents removal of upset portion 24 axially outwardly of housing 26. This retains tube 22 in housing 26.

A seal assembly consists of an O-ring 36 and a spacer 38 positioned axially inwardly of upset portion 24. O-ring 36 contacts an inner end of tube 22 and provides a fluid tight seal. It is preferred that O-ring 36 is formed of a material similar to that used for O-ring 48.

Tube 22 may move to a bleed-off position where the end of tube 22 no longer contacts seal 36, such that pressure may escape from the connector 20. To reach this position thinner portions 33 and 35 are aligned with slots 28 and retainer 30 is moved axially outwardly, but remains within slots 28. Tube 22 no longer contacts seal 36, and pressure may bleed-off.

FIG. 6 shows an alternative retainer 60 having a pair of central legs 64 and a pair of outer legs 62. Outer legs 62 are received outwardly of housing 26, and ears 68 allow outer legs to be removed from housing 26. Surfaces 66 contact upset portion 24 of tube 22 and are biased radially outwardly to allow the tube 22 to move inwardly of the housing 26.

FIG. 7 shows yet another embodiment retainer 40' having a pair of legs 41' which extend through slots in a housing 41 similar to slots 28 as shown in FIG. 1. Latches 42' prevent removal of legs 41' from the housing. Lateral inner surfaces 44' contact a tube and are biased radially outwardly by passage of the upset portion of the tube. Surfaces 44' extend laterally outwardly of legs 41'.

FIG. 8 shows an arrangement for securing a metal conduit 67 within housing 26. As shown, tube 22 has upset portion 24 which abuts spacer 38. Spacer 38 abuts a seal 36 which abuts a second spacer. Conduit 67 is positioned within housing 26 and seal 36 and the spacers seal between conduit 67 and tube 22.

FIG. 9 shows a further embodiment retainer 70 retaining a tube 68 having upset portion 69. Portions 74 extend through slots, such as slots 28, and have serrated teeth such that they wedge tube 68 and upset portion 69 within a housing.

Figure 11:
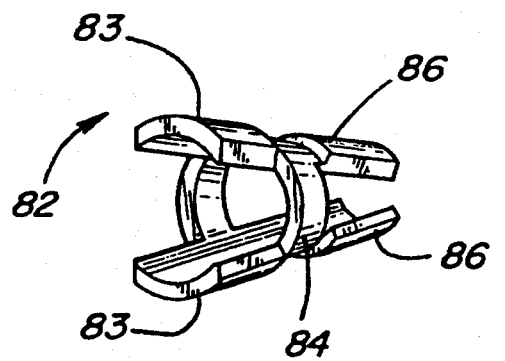
FIG. 11 is a perspective view of the retainer shown in FIG. 10.

FIG. 10 shows yet another retainer 82 for retaining a tube 78 having an upset portion 80 within a housing 76. Retainer 82 has a pair of outer grips 83 connected to a ring 84, and a pair of axially and radially inwardly extending legs 86 which abut upset portion 80. When it is desired to remove tube 78 from housing 76, one pivots grips 82 radially inwardly, which in turn pivots legs 86 radially outwardly. Upset portion 80 may then move axially outwardly of housing 76. When it is desired to insert tube 78 into housing 86, upset portion 80 is forced against an inner peripheral surface of legs 86, which bow radially outwardly to allow passage of upset portion 80. Seals 48 and 54 of materials similar to those used in FIG. 3 are included. FIG. 11 is a perspective view of retainer 82, and shows grips 83 connected to ring 84, which is also connected to legs 86.

Figure 12:
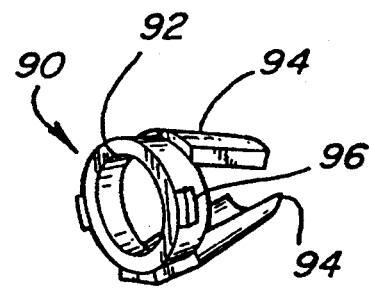
FIG. 12 is a perspective view of a seventh embodiment retainer.

FIG. 12 is a view of yet another embodiment retainer 90 having a ring 92 connected to legs 94. Positioning members 96 grip the outer lip of housing 76. Tube insertion is similar to that with retainer 82 as shown in FIG. 10.

Figure 13:
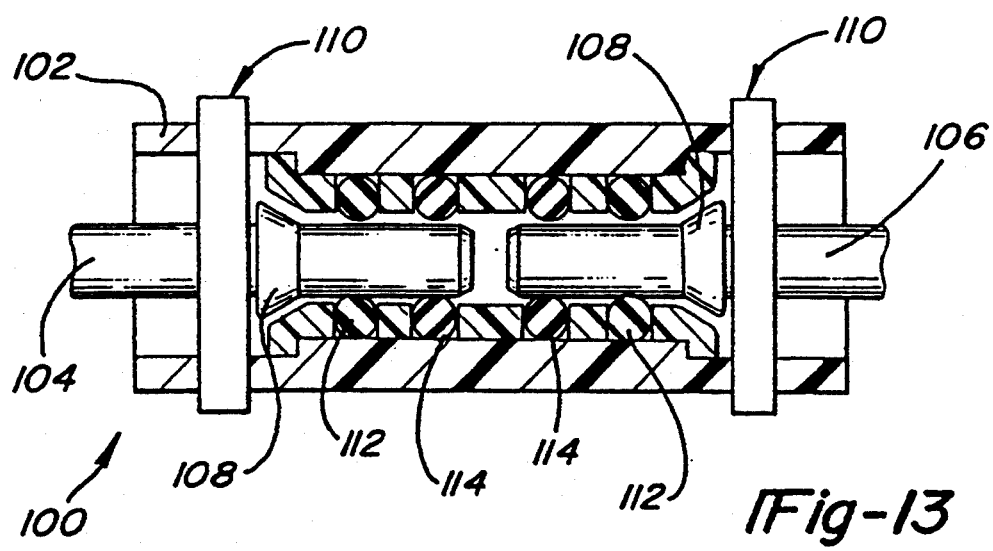
FIG. 13 is another embodiment of a tubing connector according toe present invention.

FIG. 13 shows a final embodiment 100 having a housing 102 for securing a pair of opposed tubes 104 and 106. Upset portions 108 on tubes 104 and 106 are abutted by retainers 110. Thus, two tubes 104 and 106 may be quickly and securely connected. Seals 112, 114 are positioned within housing 102 with outer seals 112, and inner seals 114 preferably formed of the respective materials disclosed with reference to FIG. 3.

Preferred embodiments of the present invention have been disclosed, however, a worker of ordinary skill in the art would recognize that certain modifications would come within the scope of this invention. For that reason, the following claims should be studied in order to determine the true scope and content of this invention.

I claim:

1. A tubing connector for use in automotive vehicle fluid line systems comprising:

a tube extending along an axis, having a first outer diameter over the majority of its axial length, and having an upset portion of a greater outer diameter over a limited portion of its axial length;

a housing, said tube having an axially inner end extending into said housing, at least one seal formed entirely of toughened fluorosilicone disposed within said housing and contacting said housing and contacting said tube at an axial location between said upset portion and said inner end of said tube to provide a fluid seal between said tube and said housing; and retainer means having resilient members positioned between an axially outer end of said housing and said upset portion, said resilient members normally abutting said upset portion to prevent tube removal from said housing, said resilient members being deformable radially outwardly to allow said upset portion to axially pass said resilient members.

2. A tubing connector as recited in claim 1, wherein said retainer means is generally C-shaped, and has two resilient legs which abut said upset portion of said tube.

3. A tubing connector as recited in claim 2, wherein there are slots extending through a radial wall of said housing, said legs extending through said slots, and said legs each have latches extending laterally inwardly to prevent removal of said legs from said slots.

4. A tubing connector as recited in claim 1, wherein said retainer means has a plurality of legs extending axially and radially inwardly from an outer end of said housing and abutting said upset portion of said tube, said legs being resiliently deformable radially outwardly such that said tube may be inserted into said housing by forcing said upset portion against an inner peripheral surface of said legs until said legs deform radially outwardly and allow passage of said upset portion, said legs being flexing radially inwardly once said upset portion has moved beyond an axially inner end of said legs to retain said upset portion in said housing.

5. A tubing connector as recited in claim 1, wherein there are a pair of seals received within said housing.

6. A tubing connector as recited in claim 5, wherein an axially outer seal is formed of a blend of fluorosilicone and fluorocarbon.

7. A tubing connector as recited in claim 6, wherein said at least one seal, an axially inner seal.

* * * * *